United States Patent
Birkbeck et al.

(10) Patent No.: US 10,674,045 B2
(45) Date of Patent: Jun. 2, 2020

(54) MUTUAL NOISE ESTIMATION FOR VIDEOS

(71) Applicant: Google Inc., Mountain View, CA (US)

(72) Inventors: Neil Birkbeck, Santa Cruz, CA (US); Mohammad Izadi, San Jose, CA (US); Anil Kokaram, Dublin (IE); Balineedu C. Adsumilli, Foster City, CA (US); Damien Kelly, San Francisco, CA (US)

(73) Assignee: Google LLC, Mountain View, CA (US)

( * ) Notice: Subject to any disclaimer, the term of this patent is extended or adjusted under 35 U.S.C. 154(b) by 253 days.

(21) Appl. No.: 15/609,826

(22) Filed: May 31, 2017

(65) Prior Publication Data
US 2018/0352118 A1    Dec. 6, 2018

(51) Int. Cl.
G06K 9/00    (2006.01)
H04N 5/21    (2006.01)
G06T 5/00    (2006.01)

(52) U.S. Cl.
CPC ............. *H04N 5/21* (2013.01); *G06T 5/002* (2013.01); *G06T 2207/10016* (2013.01); *G06T 2207/20021* (2013.01); *G06T 2207/20182* (2013.01)

(58) Field of Classification Search
None
See application file for complete search history.

(56) References Cited

U.S. PATENT DOCUMENTS

| | | | | |
|---|---|---|---|---|
| 5,500,685 A * | 3/1996 | Kokaram | ............... | H04N 5/145 348/620 |
| 5,844,627 A * | 12/1998 | May | ............... | H04N 5/21 348/607 |
| 6,067,125 A * | 5/2000 | May | ............... | H04N 5/21 348/451 |
| 6,244,514 B1 * | 6/2001 | Otto | ............... | G06Q 20/346 235/492 |
| 6,295,382 B1 * | 9/2001 | Karanovic | ............... | G06T 5/20 358/463 |

(Continued)

FOREIGN PATENT DOCUMENTS

WO    2015172234       11/2015
WO    2016185708 A1    11/2016

OTHER PUBLICATIONS

Spatio-Temporal . . . Denoising, Jia Chen et al., IEEE, 1-4244-1180-7, 2007, pp. 1-8 (Year: 2007).*

(Continued)

*Primary Examiner* — Jayesh A Patel
(74) *Attorney, Agent, or Firm* — Lowenstein Sandler LLP

(57) ABSTRACT

Implementations disclose mutual noise estimation for videos. A method includes determining an optimal frame noise variance for intensity values of each frame of frames of a video, the optimal frame noise variance based on a determined relationship between spatial variance and temporal variance of the intensity values of homogeneous blocks in the frame, identifying an optimal video noise variance for the video based on optimal frame noise variances of the frames of the video, selecting, for each frame of the video, one or more of the blocks having a spatial variance that is less than the optimal video noise variance, the one or more frames selected as the homogeneous blocks, and utilizing the selected homogeneous blocks to estimate a noise signal of the video.

20 Claims, 6 Drawing Sheets

(56) References Cited

U.S. PATENT DOCUMENTS

| | | | | |
|---|---|---|---|---|
| 6,999,634 B2* | 2/2006 | Hong | G06T 5/20 348/241 |
| 7,286,666 B1* | 10/2007 | Coron | G06F 7/725 380/28 |
| 7,538,822 B2* | 5/2009 | Lee | G06T 5/20 348/606 |
| 7,652,788 B2* | 1/2010 | Foi | H04N 5/3651 358/1.6 |
| 7,715,645 B2* | 5/2010 | Zhou | H04N 5/21 358/3.26 |
| 7,792,381 B2* | 9/2010 | Rhee | H04N 5/21 348/606 |
| 7,822,286 B2* | 10/2010 | Yea | G06T 5/20 382/205 |
| 7,941,297 B2* | 5/2011 | Mirel | G06T 5/002 348/241 |
| 8,023,762 B2* | 9/2011 | Rhee | H04N 5/21 348/606 |
| 8,063,993 B2* | 11/2011 | Peng | H04N 5/21 348/607 |
| 8,279,345 B2* | 10/2012 | Rossignol | G06K 9/40 348/618 |
| 8,761,540 B2 | 6/2014 | Yang et al. | |
| 8,982,947 B2* | 3/2015 | Au | H04N 19/176 375/240.03 |
| 9,031,322 B2* | 5/2015 | Lai | G06T 7/0002 382/168 |
| 9,143,658 B2* | 9/2015 | Matsuoka | H04N 5/21 |
| 9,183,617 B2* | 11/2015 | Goh | H04N 19/117 |
| 9,686,537 B2* | 6/2017 | Geiss | H04N 17/002 |
| 9,852,353 B2* | 12/2017 | Lin | G06K 9/46 |
| 2004/0179602 A1* | 9/2004 | Le Meur | H04N 19/105 375/240.12 |
| 2005/0105627 A1* | 5/2005 | Sun | H04N 5/21 375/240.29 |
| 2005/0107982 A1* | 5/2005 | Sun | H04N 5/21 702/179 |
| 2005/0110901 A1* | 5/2005 | Alfonso | H04N 7/012 348/448 |
| 2005/0271298 A1* | 12/2005 | Yu | H04N 17/00 382/286 |
| 2005/0281479 A1* | 12/2005 | Song | H04N 19/139 382/275 |
| 2006/0103765 A1* | 5/2006 | Zhou | H04N 5/21 348/701 |
| 2006/0158562 A1* | 7/2006 | Rhee | H04N 5/21 348/607 |
| 2006/0256853 A1* | 11/2006 | Schlockermann | H04N 19/50 375/240.03 |
| 2007/0223057 A1* | 9/2007 | Berestov | G06T 5/002 358/463 |
| 2008/0152256 A1* | 6/2008 | Ou | G06K 9/40 382/276 |
| 2008/0158169 A1* | 7/2008 | O'Connor | G06F 3/0418 345/173 |
| 2008/0310677 A1* | 12/2008 | Weismuller | G06K 9/3241 382/103 |
| 2008/0316363 A1* | 12/2008 | Peng | H04N 5/21 348/607 |
| 2009/0278961 A1* | 11/2009 | Mohanty | G06T 5/50 348/241 |
| 2010/0097389 A1* | 4/2010 | Lim | G06T 7/12 345/589 |
| 2011/0118599 A1* | 5/2011 | Osumi | A61B 8/00 600/437 |
| 2012/0019667 A1* | 1/2012 | Moesle | H04N 5/21 348/180 |
| 2012/0076344 A1* | 3/2012 | Reed | G06T 1/0028 382/100 |
| 2012/0275655 A1 | 11/2012 | Uchida et al. | |
| 2013/0016900 A1* | 1/2013 | Kim | G06T 5/20 382/162 |
| 2013/0136182 A1* | 5/2013 | Huang | H04N 19/56 375/240.16 |
| 2013/0315458 A1* | 11/2013 | Beymer | G06T 7/13 382/130 |
| 2014/0219578 A1* | 8/2014 | Peng | H04N 1/60 382/264 |
| 2015/0235350 A1* | 8/2015 | Kwan | G06T 5/002 382/254 |
| 2016/0337628 A1* | 11/2016 | Kong | H04N 9/045 |
| 2016/0343113 A1* | 11/2016 | Choudhury | G06T 5/002 |

OTHER PUBLICATIONS

Video Denoising . . . Model, Gijesh Varghese et al., IEEE, 1051-8215, 2010, pp. 1032-1040 (Year: 2010).*

Towards an evaluation . . . Noise, Tamara Seybold et al., IEEE, 978-0-7695-5140-1, 2013, pp. 203-210 (Year: 2013).*

Denoising . . . Cameras, Li Zhang et al., IEEE, 978-1-4244-6985-7, 2010, pp. 522-529 (Year: 2010).*

A real-time . . . Estimation, Mohammed Ghazal et al., IEEE, 1051-8215, 2007, pp. 1690-1699 (Year: 2007).*

Fast and Reliable . . . Estimation, Aishy Amer et al., IEEE, 1051-8215, 2005 pp. 113-118 (Year: 2005).*

PCT Notification of Transmittal of the International Search Report and the Written Opinion of the International Searching Authority for International Application No. PCT/US2018/021840, dated May 9, 2018, 14 pages.

Amer, Aishy and Dubois, Eric, 2005. "Fast and Reliable Structure-Oriented Video Noise Estimation." IEEE Transactions on Circuits and Systems for Video Technology 15 (1): 11318, 6 pages.

Song, Byung Cheol and Chun, Kang Wook, 2003. "Motion-Compensated Noise Estimation for Efficient Prefiltering in a Video Encoder." In Proceedings 2003 International Conference on Image Processing (Cat. No. 03CH37429). doi:10.1109/icip.2003.1246654, 4 pages.

Shin, Dong-Hyuk, et al., 2005. "Block-Based Noise Estimation Using Adaptive Gaussian Filtering." In 2005 Digest of Technical Papers. International Conference on Consumer Electronics, 2005. ICCE. doi:10.1109/icce.2005.1429818, 9 pages.

Ghazal, M., et al., 2007. "A Real-Time Technique for Spatio-Temporal Video Noise Estimation" IEEE Transactions on Circuits and Systems for Video Technology 17 (12): 169099, 10 pages.

Kokaram, Anil, et al., 2012. "Measuring Noise Correlation for Improved Video Denoising." In 2012 19th IEEE International Conference on Image Processing. doi:10.1109/icip.2012.6467081, 4 pages.

Lei, Zhu and Peixia Xu, 2006. "Differential Video Noise Estimation." In 2006 International Conference on Communication Technology. doi:10.1109/icct.2006.341753, 4 pages.

Song, Byung Cheol and Kim, Nak Hoon, 2008. "Motion-Compensated Noise Estimation for Effective Video Processing" In Visual Communications and Image Processing 2008. doi:10.1117/12.761090, 7 pages.

Yin, Wenjie and Zhao, Haiwu. 2012, "A Novel Method of Video Noise Estimation Based on Motion Estimation." in 2012 IEEE International Conference on Signal Processing, Communication and Computing (ICSPCC 2012). doi:10.1109/icspcc.2012.6335636, 5 pages.

Zlokolica, Vladimir, et al., 2006. "Noise Estimation for Video Processing Based on Spatio-Temporal Gradients." IEEE Signal Processing Letters 13 (6): 33740, 4 pages.

Rakhshanfar, Meisam and Amer, Aishy, "Homogeneity classification for signal dependent noise estimation in images," in Image Processing (ICIP), IEEE Int. Conf. on, Oct. 2014, pp. 4271-4275, 5 pages.

Yang, Shih-Ming and Tai, Shen-Chuan, "Fast and reliable image-noise estimation using a hybrid approach," Journal of Electronic Imaging, vol. 19, No. 3, pp. 033007-033007, 2010, [retrieved from the internet on May 31, 2017], 2 pages.

* cited by examiner

Identify optimal video noise variance for each video of a set of videos corresponding to a determined type of video capture device, where the optimal video noise variance is a median value of optimal frame noise variances of the frames of the video, where the optimal frame noise variances are based on a determined relationship between spatial and temporal variance of homogeneous blocks in each of the frames
510

Generate a noise model corresponding to the determined type of video capture device based on the identified optimal video noise variances
520

Store the noise model for the determined type of video capture device
530

Apply the stored noise model to denoise one or more uploaded videos indicated as captured by the determined type of video capture device
540

FIG. 5

MUTUAL NOISE ESTIMATION FOR VIDEOS

TECHNICAL FIELD

This disclosure relates to the field of video processing and, in particular, to mutual noise estimation for videos.

BACKGROUND

Videos are often corrupted by noise produced during video acquisition, recording, processing, and transmission. Noise may refer to random variations in brightness or color information in an image that is not present in the object being imaged. Noise degrades the visual quality of videos while impacting the effectiveness and performance of many video processing applications, such as video compression, segmentation, format conversion, motion estimation, denoising, and filtering. The outcome of such video processing applications can be improved when accurate information about the noise signal is available. The accuracy of video noise estimation is an important component in the field of signal and noise processing.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes determining, by a processing device, an optimal frame noise variance for intensity values of each frame of frames of a video, the optimal frame noise variance based on a determined relationship between spatial variance and temporal variance of the intensity values of homogeneous blocks in the frame, identifying an optimal video noise variance for the video based on optimal frame noise variances of the frames of the video, selecting, for each frame of the video, one or more of the blocks having a spatial variance that is less than the optimal video noise variance, the one or more frames selected as the homogeneous blocks, and utilizing, by the processing device, the selected homogeneous blocks to estimate a noise signal of the video.

In one implementation, each of the blocks includes N×N pixels of the frame, where N is a positive number. In addition, each of the blocks may be at least half-overlapped. The method may further include processing of the video using the estimated noise signal of the video, where processing the video may include one or more of video compression, segmentation, format conversion, motion estimation, denoising, or filtering.

In one implementation, determining the optimal frame noise variance for each frame may further include computing a spatial variance of each block in the frame, computing a temporal variance of each block in the frame, converting each of the temporal variance of the blocks of the frame to converted temporal variance based on the determined relationship between the spatial and temporal variances and based on an assumption that a noise covariance between the homogeneous block is a constant value, applying a first function to the spatial variances in the frame, the first function to provide an average of the spatial variances over the blocks in the frame having spatial variance values less than a variance value 'x' for a range of variance values, applying a second function to the converted temporal variances in the frame, the first function to provide an average of the converted temporal variances over the blocks in the frame having converted temporal variance values less than a variance value 'x' for the range of variance values, and selecting the optimal frame noise variance value for the frame based on an intersection of the applied first function and the applied second function.

In some implementations, the temporal variance utilizes a determined number of frames prior to and subsequent to the frame. In addition, the range of variance values may include variance values from zero to a maximum variance over a union of a set of the spatial variances and the temporal variances for the frame. In one implementation, the intersection point is less than an absolute maximum of $V(x)$, wherein $V(x)$ comprises a variance of a difference between the applied first function and the applied second function at a variance value of x. Furthermore, the intensity values of each frame may include a numerical value of a pixel in the frame, where the numerical value corresponds to a grey level value of the pixel. The intensity values of each frame may also include a numerical value of a pixel in the frame, where the numerical value corresponds to a color channel value of the pixel. In addition, the optimal video noise variance may be a median value of optimal frame noise variances of the frames of the set of videos.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The disclosure is illustrated by way of example, and not by way of limitation, in the figures of the accompanying drawings.

FIG. 5 is a flow diagram illustrating a method for generating noise models for video capture devices using mutual noise estimation for videos, according to an implementation.

DETAILED DESCRIPTION

Figure 1:
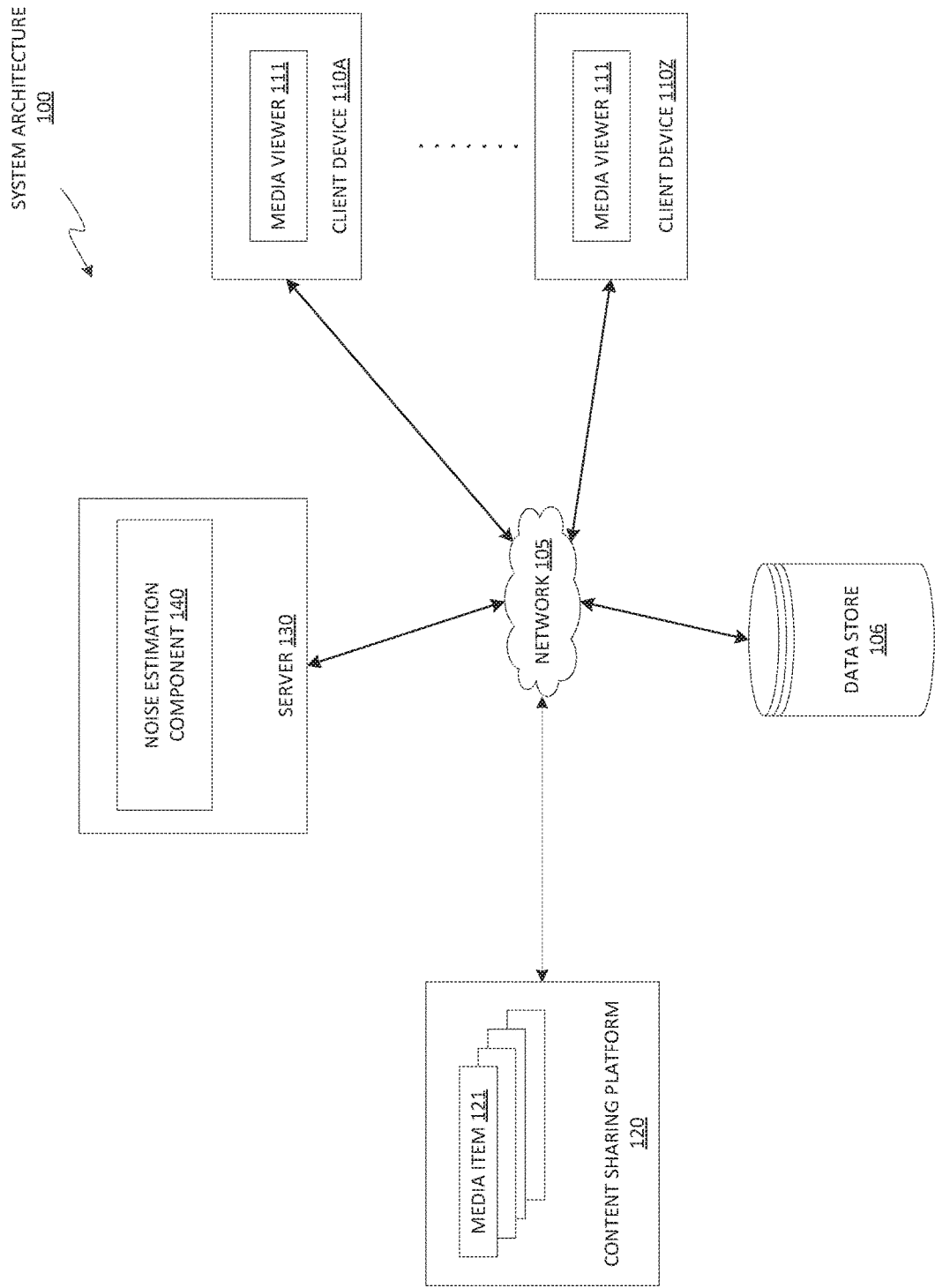
FIG. 1 is a block diagram illustrating an exemplary network architecture in which implementations of the disclosure may be implemented.

Aspects and implementations of the disclosure are described for mutual noise estimation for videos. Videos are often corrupted by noise produced during video acquisition, recording, processing, and transmission. Noise may refer to random variations in brightness or color information in an image that is not present in the object being recorded. Accurate estimation of the noise present in a particular video is useful for many video processing applications, such as video compression, segmentation, format conversion, motion estimation, denoising, and filtering. The estimated noise level present in the video can be used to tune parameters of the corresponding video processing application. The outcome of such video processing applications can be improved when accurate information about the estimated noise level is available.

In general, video noise estimation systems identify the most intensity-homogeneous blocks in video frames of a video. Any intensity variations within the identified intensity-homogeneous blocks are assumed to be noise. A block of a video frame may refer to a portion of the video frame comprising a subset of pixels of the frame. Intensity may refer to a numerical value of a pixel in the video frame. For example, in grayscale images, intensity is the grey level value at each pixel (e.g., 127 is darker than 220). In another example, in color images, intensity can be determined based on numerical values of each color channel (e.g., red, green, blue (RGB) color channels) in the color image. As used herein, the term "homogeneous" may refer to having a flat appearance (e.g., consistently a single color throughout a block, with no texture). Similarly, intensity-homogeneous blocks may refer to those blocks of a video frame that have little to no variation in value of intensity among the pixels of the block.

Some conventional video noise estimation systems rely purely on temporal information of videos to estimate noise levels, while other conventional video noise estimation systems rely purely on spatial information. Yet other conventional video noise estimation systems rely on the spatial-temporal domain of videos. However, generally all of the conventional video noise estimation systems rely on either, or both of, inaccurate predefined thresholds and/or inaccurate assumptions about homogeneous blocks in a video. An example of an inaccurate predefined threshold may include selecting a top X % of blocks as homogeneous blocks. An example of an inaccurate assumption may be setting the median variance of top X most homogeneous blocks as a reference variance to identify homogeneous blocks.

As a result, the accuracy of such conventional systems is bounded to the selection of homogeneous blocks based on these predefined thresholds and/or assumptions. This can lead to overestimating or underestimating the noise in a video. In addition, the conventional video noise estimation systems also restrict a noise signal to having the same power for areas within a video frame having different intensities. As the noise may be different for various intensities and colors, the conventional video noise estimation systems generally fail to select a comprehensive set of noise-representative blocks and lead to inaccurate noise estimation.

Unlike conventional video noise estimation systems, implementations of the disclosure identify homogeneous blocks by dynamically determining two noise variances (spatial and temporal) of frames of a video, rather than using fixed thresholds and predefined noise model assumptions. A video noise estimation component of implementations of the disclosure estimates the noise in a video by identifying homogeneous spatial-temporal blocks (homogeneous blocks) in each frame of the video.

The video noise estimation component initially determines spatial variance and temporal variance of intensities of blocks in the frames of the video. The noise estimation component then determines an optimal frame noise variance for the frame. The optimal frame noise variance is based on a determined relationship between the spatial and temporal variances that exists when the blocks are homogeneous in intensity. This optimal frame noise variance may then be utilized to identify the homogeneous blocks in a video, where the identified homogeneous blocks may vary in intensity and/or color when compared to one another. These homogeneous blocks may be used to estimate a noise signal of the video.

Implementations of the disclosure provide a technical advantage over the conventional video noise estimation system by selecting an optimal frame noise variance that is based on a determined relationship between the spatial and temporal variances that exists when the blocks are homogeneous in intensity. Implementations of the disclosure also provide a technical improvement for video noise estimation by improving the efficiency of the noise estimation process to more precisely identify and extract noise signals in a video. The precise identification and extraction of noise signals provided by implementations of the disclosure result in more accurate noise estimation for video processing applications, resulting in better visual quality of videos.

The disclosure often references videos for simplicity and brevity. However, the teachings of the disclosure are applied to media items generally and can be applied to various types of content or media items, including for example, video, audio, text, images, program instructions, etc.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital videos, digital images, electronic books, etc.). According to aspects of the disclosure, the media viewer 111 may be a content sharing platform application for leveraging aggregated network statistics for enhancing quality and user experience for live video streaming from mobile devices.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

It should be noted that functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may host data content, such as media items 121. The data content can be digital content chosen by a user, digital content made available by a user, digital content uploaded by a user, digital content chosen by a content provider, digital content chosen by a broadcaster, etc. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. As an example, users of the client devices 110A-110Z may each transmit a request to the server 130 over the network 105 to download and/or stream one or more videos stored at the data store 106. In addition, users of client devices 110A-110A may also transmit a request to the server 130 over the network 105 to upload one or more videos stored and/or captured at the client devices 110A-110Z to the server 130.

In implementations of the disclosure, the server 130 may include a noise estimation component 140. The noise estimation component 140 extracts a noise signal from a video and estimates a noise level of the video. To extract and estimate the noise in the video, the noise estimation component 140 may identify homogeneous spatial-temporal blocks (also referred to herein as homogeneous blocks), in each frame of the video. As discussed above, the term homogeneous may refer to having a flat appearance (i.e., consistently a single color throughout with no texture). The homogeneous blocks are found by solving two noise equations for spatial and temporal variance for the frames of the video. The noise estimation component 140 provides the noise estimation for a video based on configured parameters that provide a set relationship between the spatial and temporal noise variances that exists for homogeneous blocks in a video. Furthermore, the noise estimation component 140 takes into account blocks within frames of the video that have varying intensities and colors.

In some implementations, noise estimation component 140 of server 130 may interact with content sharing platform 120 to provide leveraging aggregated network statistics for enhancing quality and user experience for live video streaming from mobile devices. Although illustrated and described as separate components, noise estimation component 140 may be implemented as a single component at server 130 and/or content sharing platform 120. Further description of the noise estimation component 140, as well as its specific functions, is described in more detail below with respect to FIG. 2.

Although implementations of the disclosure are discussed in terms of content sharing platforms and mutual noise estimation for videos uploaded to content sharing platforms, implementations may also be generally applied to any type of social network providing connections between users. Implementations of the disclosure are not limited to content sharing platforms that provide channel subscriptions to users.

In situations in which the systems discussed here collect personal information about users (e.g., collection of network statistics from media viewers 111, collection of network connectivity data, etc.) or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
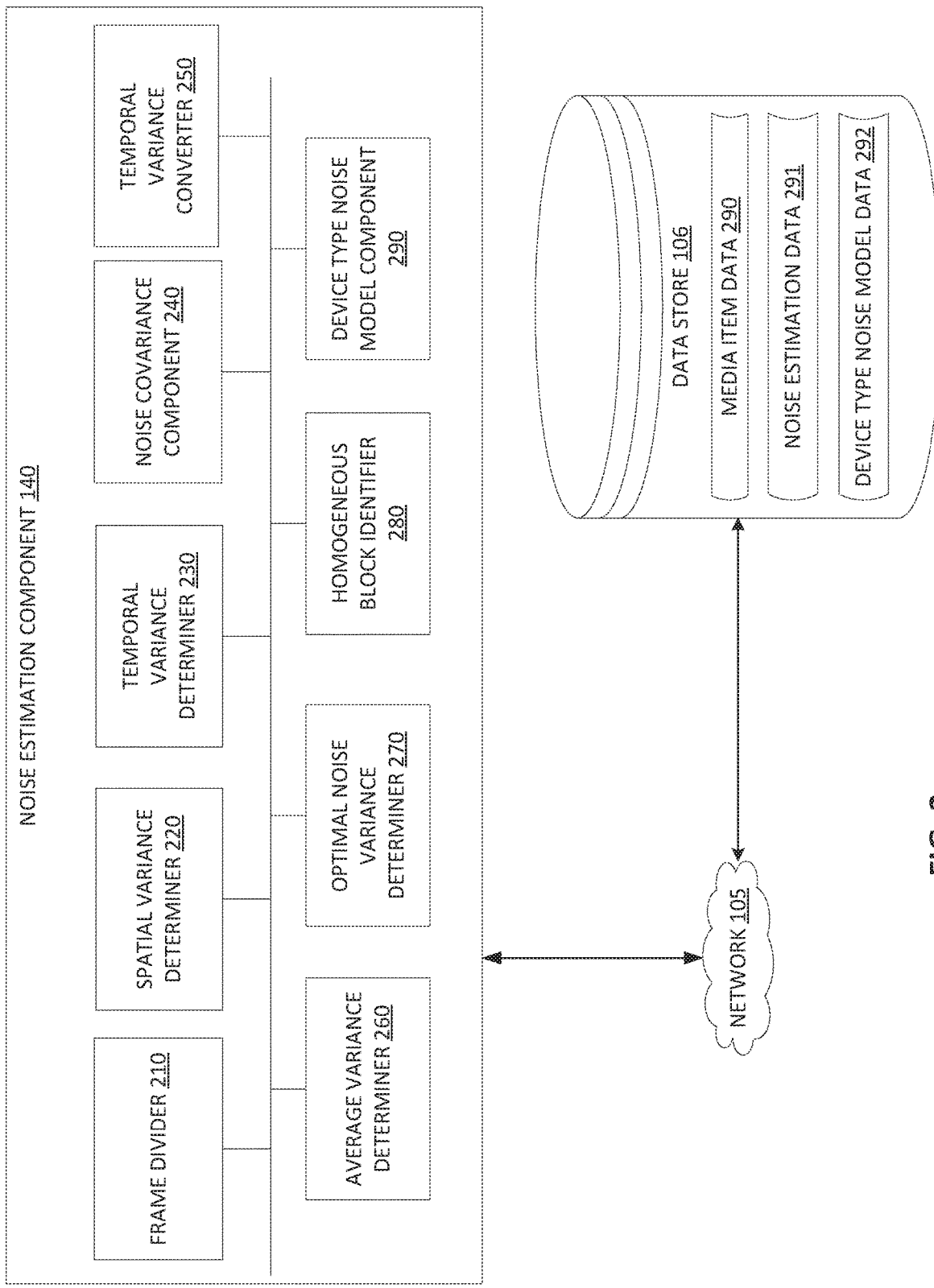
FIG. 2 is a block diagram of a noise estimation component, in accordance with an implementation of the disclosure.

FIG. 2 is a block diagram illustrating a noise estimation component 140 in accordance with one implementation of the disclosure. As discussed above, the noise estimation component 140 may interact with a single social network, or may be utilized among multiple social networks (e.g., provided as a service of a content sharing platform that is utilized by other third party social networks).

In one implementation, the noise estimation component 140 includes a frame divider 210, a spatial variance determiner 220, a temporal variance determiner 230, a noise covariance component 240, a temporal variance converter 250, an average variance determiner 260, an optimal noise variance determiner 270, a homogeneous block identifier 280, and a device type noise model component 290. More or less components may be included in the noise estimation component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The noise estimation component 140 is communicatively coupled to the data store 106. For example, the noise estimation component 140 may be coupled to the data store 106 via a network (e.g., via network 105 as illustrated in FIG. 1). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes media item data 290, noise estimation data 291, and device type noise model data 292.

As discussed above, the noise estimation component 140 may extract a noise signal from a video and estimate a noise level of the video. To extract and estimate the noise in the video, the noise estimation component 140 may identify homogeneous spatial-temporal blocks (homogeneous blocks), in each frame of the video.

To identify the spatial-temporal homogeneous blocks, the noise estimation component 140 first invokes the frame divider 210 to divide a video frame of the video into blocks. Assume that $I^t$ (x, y) (also referred to as I (x, y, t) herein) is an intensity image of frame 't' in a video. The intensity image (intensity) may refer to a numerical value corresponding to a pixel in an image. For example, in grayscale images, intensity is the grey level value at each pixel (e.g., 127 is darker than 220). In another example, in color images, intensity can be determined based on numerical values of each color channel (e.g., red, green, blue (RGB) color channels) in the color image. The video may be stored as media item data 290 in data store 106. The noise estimation component 140 performs a noise estimation process to identify flat/homogeneous blocks containing the noise signal in frame t.

The blocks may be half-overlapped blocks with size of N×N pixels (e.g., half the pixels in a first block of a frame are also members of a second block of the frame, and so on), where N is a positive number. For example, for a 1920×1080 video, N may equal 32. An example representation of a half-overlapped block 'B' at frame 't' may be as follows:

$$B^t(u,v,x_i,y_i)=I^t((u*N)/2+x_i,(v*N)/2+y_i);$$

where $x_i$, $y_i$ are elements of the set: [0, . . . , N−1];

u, v are indices indicating relative position of block 'B' within frame 't' (e.g., assuming there are Z blocks in frame 't', u, v are elements of the set: [0, . . . , Z−1].

For every block of a frame, the spatial variance determiner 220 computes the spatial variance of the block. The spatial variance of a block is the intensity variance of the block's pixels. In one implementation, spatial variance of a block may be computed as follows:

$$\text{Var}_{spatial}(B^t(u, v, x_i, y_i)) = \text{Var}(B^t(u, v, x_i, y_i)); \text{ where}$$

$$\text{Var}(B^t(u, v, x_i, y_i)) = \frac{1}{N^2}\sum_{x_i=0}^{N-1}\sum_{y_i=0}^{N-1}(B^t(u, v, x_i, y_i) - E(B^t(u, v, x_i, y_i)))^2, \text{ and}$$

$$E(B^t(u, v, x_i, y_i)) = \frac{1}{N^2}\sum_{x_i=0}^{N-1}\sum_{y_i=0}^{N-1}B^t(u, v, x_i, y_i).$$

E(.) returns the mean value of a set. The spatial variance of each block, B, in a frame, t, may be collected in the set $S_p$.

The temporal variance determiner 230 also computes, for every block, B, in a frame, t, the temporal variance separately from the spatial variance. The temporal variance of a block is computed by the temporal variance determiner 230 using M frames before and after the frame, t. Previous frames are I(x,y,t−z) for z=1, . . . , M, and next frames are I(x,y,t+z) for z=1, . . . , M. In one implementation, temporal variance of a block may be computed as follows:

$$\text{Var}_{temporal}(B^t(u, v, x_i, y_i)) = \text{Var}(B^t(u, v, x_i, y_i) - \overline{B}(u, v, x_i, y_i)), \text{ where}$$

$$\overline{B}(u, v, x_i, y_i) = \frac{1}{2M+1}\sum_{k=-M}^{M}B^{t+k}(u, v, x_i, y_i).$$

In one implementation, a motion compensation algorithm is applied to project the previous and next frames into the frame I(x,y,t). The temporal variance is then computed for each pixel over all motion-compensated frames I(x,y,z) for z=t−M, . . . , t+M (2M+1 frames in total). The resulting frame may be referred to as D(x,y). The variance of D(x,y) is computed for every block, B, and added to set $S_t$.

The noise covariance component 240 establishes conditions for the noise estimation component 140 to comply with when performing the noise estimation of implementations of the disclosure. In theory, the spatial and temporal variance, computed in the aforementioned way and collected in $S_p$ and $S_t$, establish the following equation:

$$s=\text{Var}(I(x,y,t)), (x,y) \text{ a block,}$$

$$t=\text{Var}(I(x,y,t)-I(x,y,z)/(2M+1)), z=t-M, \ldots, t+M$$

$$=>t=\text{Var}(I(x,y,t)-I(x,y,z)/(2M+1))=\text{Var}((2M*I(x,y,t)/(2M+1)-I(x,y,z)/(2M+1)),$$

zt $$=>t=2M^*\text{Var}(I(x,y,t)/(2M+1))-2M^* \varsigma /(2M+1)$$

$$=>t=2M^*s/(2M+1)-2M^* \varsigma /(2M+1)=2M/(2M+1)^*(s-\varsigma),$$

or $s=(2M+1)^*t/2M+\varsigma$ where s and t are spatial and temporal noise power, Var(.) is the variance function, and $\varsigma$ is noise covariance computed for two blocks in two different frames.

Here, the noise covariance component 240 establishes the condition that the noise covariance is assumed to be fixed (a constant which is zero for white noise and nonzero for correlated noises). As a result, homogeneous blocks should satisfy the following equation:

$$\varsigma = s-(2M+1)^*t/2M$$

In other words, if the maximum noise power is v, the spatial noise power of homogeneous blocks is expected to be less than v, and the noise covariance $\varsigma$ computed for homogeneous blocks is assumed to be a constant value. Noise covariance component 240 may configure parameters of the noise estimation component 140 so that the spatial and temporal variances of homogeneous blocks are expected to comply with the above-described relationship.

By establishing the conditions via the noise covariance component 240, homogeneous blocks can be detected according to the description below. As an initial matter, the temporal variance converter 250 sets the noise covariance to zero, and converts all of the temporal noise variances, t, in the set $S_t$ to:

(2M+1)*t/2M.

The conversion performed by the temporal variance converter 250 is based on the determined relationship between spatial variance and temporal variance for homogeneous blocks described above.

The average variance determiner 260 then defines a function, $P_s(x)$ that takes the maximum noise power, x (which is in the range of 0 to the maximum variance over the union of set $S_p$ and $S_t$ with step size of x), as an input, and returns the average of spatial variances over those blocks with a spatial variance (collected in $S_p$) that is less than x. Similarly, the average variance determiner 260 defines a function, $P_t(x)$ that takes the maximum noise power, x, as an input, and returns the average of the converted temporal variances over those blocks with a temporal variance (collected in $S_t$) that is less than x.

The optimal noise variance determiner 270 then identifies an optimal noise variance for the frame. Based on the conditions established by the noise covariance component 240, the difference between spatial and converted temporal noise variances of homogeneous blocks should be a constant value for the actual maximum noise power, v. Therefore, the distance between every corresponding point on the two functions, $P_s(x)$ and $P_t(x)$, from 0 to v is expected to be fixed. This means the variance of ($P_s(x)-P_t(x)$) over the points from 0 to v should be close to zero. The mean function can be defined as $E(x)=\text{Mean} (P_s(y)-P_t(y))$ and the variance function as $V(x)=\text{Var} (P_s(y)-P_t(y))$ for y=0 to x. Here, (x) is the estimated noise covariance, $\varsigma$, at the noise power of x.

Subsequently, the optimal noise variance determiner 270 can identify the actual noise power (variance) v (referred to herein as optimal frame noise variance), such that v is:
(1) less than the absolute maximum on V(x),
(2) is an intersection point between $P_s(x)$ and $(P_t(x)+(x))$; and
(3) V(v) is close to zero (e.g., should be less than a threshold percentage of V(x) at the absolute maximum; for example, less than 5% of V(x) at the absolute maximum).

After determining the optimal frame noise variance for each frame of the video, the optimal noise variance determiner 270 can identify the optimal maximum noise power (also referred to herein as optimal video noise variance) of the video. In one implementation, the optimal video noise variance is the median of all of the optimal frame noise variances determined for each of the frames of the video.

Using the optimal video noise variance of the video, the homogeneous block identifier 280 may select those blocks having a spatial variance less than the optimal video noise variance as homogeneous blocks. The identified homogeneous block can be utilized for noise signal estimation of the video.

In one implementation, the optimal frame noise variance of each frame, as well as the optimal video noise variance of the video may be stored as noise estimation data 291 in data store 106. The noise estimation process described above as performed by noise estimation component 140 may be used to estimate noise for a set of videos (e.g., stored as media item data 290 of data store 106) captured by different video capture devices. Each type of video capture device may have unique noise characteristics and/or a unique noise model. The device type noise model component 290 may analyze the stored noise estimation data 291 to extract and generate noise models for each type of video capture device. Subsequently, the device noise model for each type of video capture device may be utilized in video processing applications (e.g., denoising) applied against a video uploaded by a particular video capture device.

Figure 3:
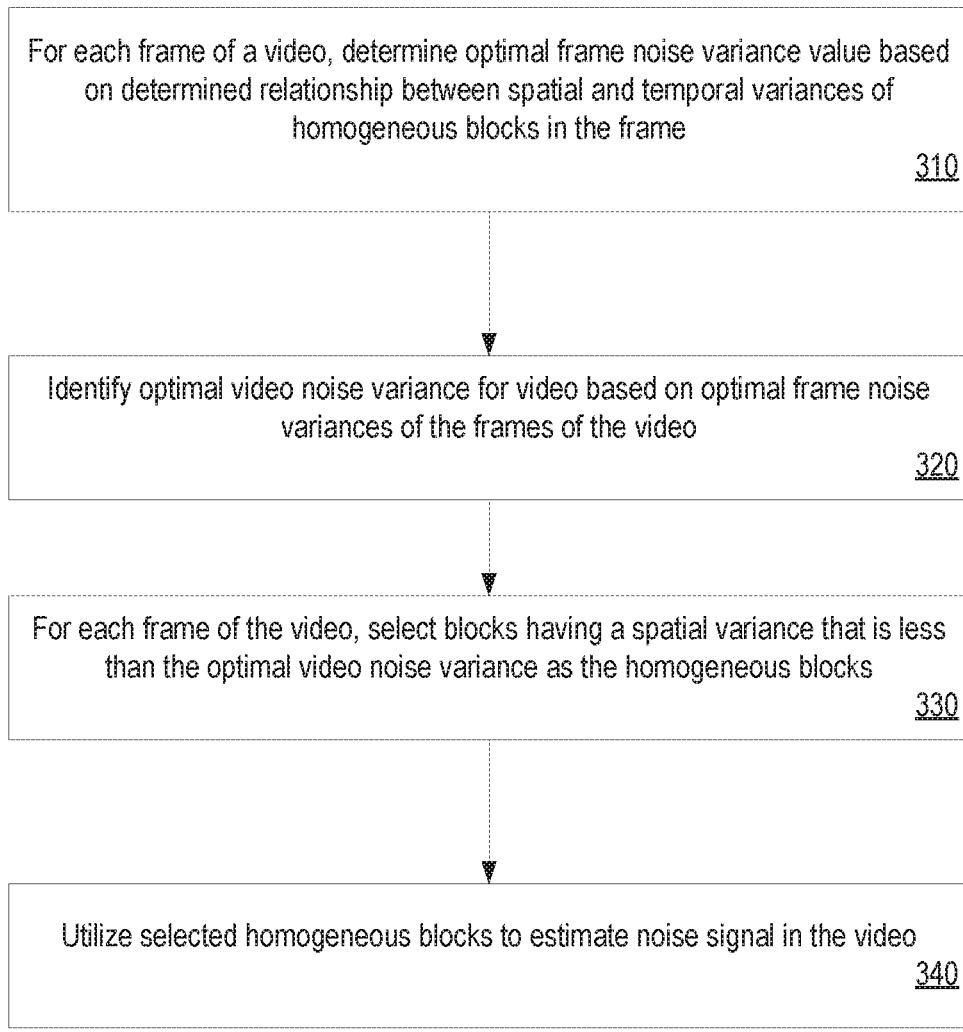
FIG. 3 is a flow diagram illustrating a method for mutual noise estimation for videos, according to an implementation.

FIG. 3 is a flow diagram illustrating a method 300 for mutual noise estimation for videos, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art should understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by noise estimation component 140, as shown in FIG. 2.

Method 300 begins at block 310 where for each frame of a video, an optimal frame noise variance value is determined based on a determined relationship between spatial and temporal variances of homogeneous blocks in the frame. Then, at block 320, an optimal video noise variance for the video is identified based on optimal frame noise variances of the video. The optimal frame noise variances are those determined in block 310 as described above. In one implementation, the optimal video noise variance is the median value of the optimal frame noise variances of the frames in the video.

Subsequently, at block 330, for each frame of the video, blocks are selected having a spatial variance that is less than the optimal video noise variance. In one implementation, these selected blocks are considered homogeneous blocks of the video. Lastly, at block 340, the selected homogeneous blocks are utilized to estimate a noise signal for the video. In one implementation, the estimated noise signal is used in processing of the video. The processing may include, but is not limited to, video compression, segmentation, format conversion, motion estimation, denoising, and/or filtering, to name a few examples.

Figure 4:
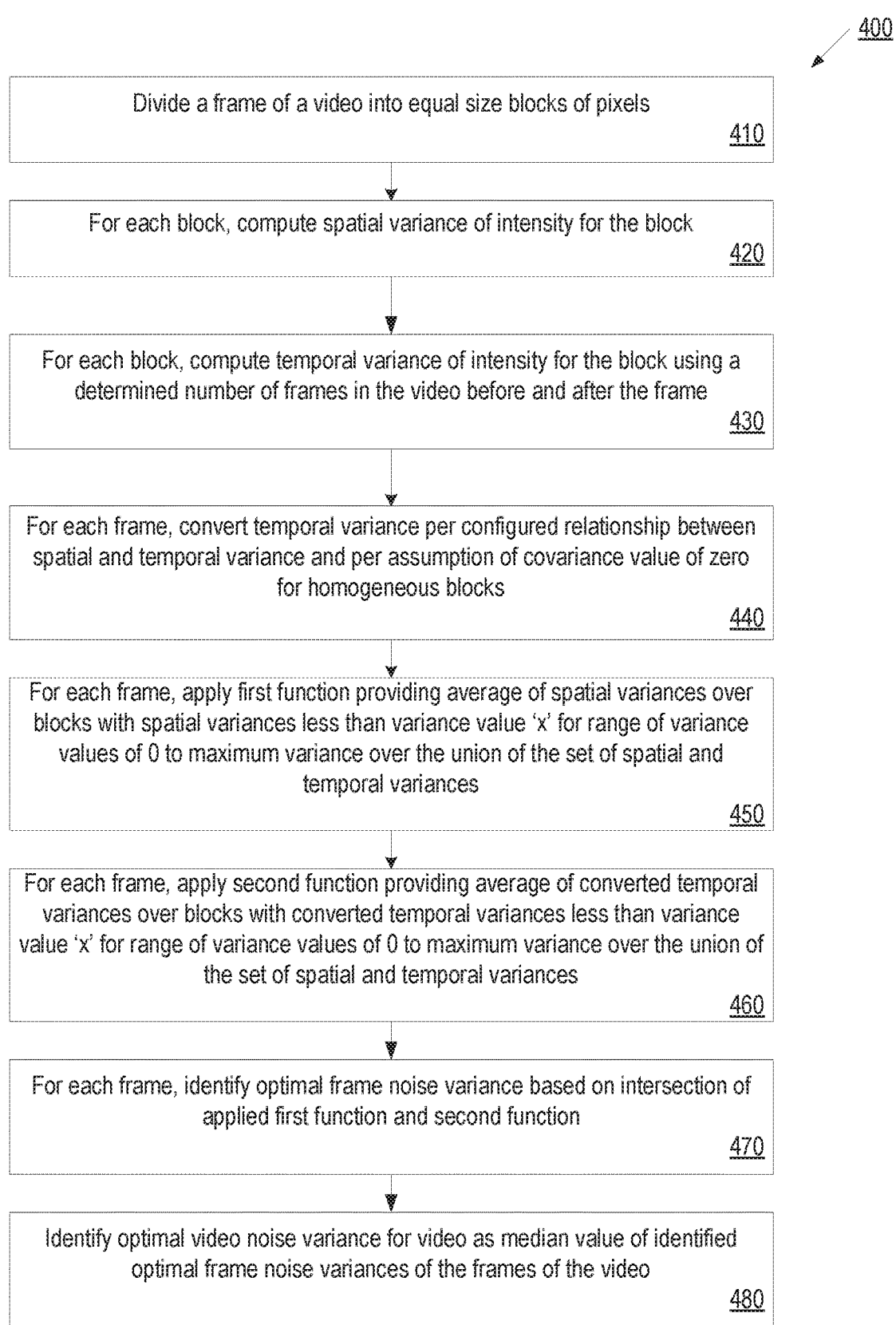
FIG. 4 is a flow diagram illustrating another method for mutual noise estimation for videos, according to an implementation.

FIG. 4 is a flow diagram illustrating another method 400 for mutual noise estimation for videos, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by noise estimation component 140 as shown in FIG. 2.

Method 400 begins at block 410 where a frame of a video is divided into equal size blocks of pixels. In one implementation, the blocks are half-overlapped blocks. At block 420, for each block, a spatial variance of intensity is computed for the block. Then, at block 430, for each block, a temporal variance of intensity is computed for the block. In one implementation, a determined number of frames prior to and subsequent to the frame are utilized in computing the temporal variance of the block.

Subsequently, at block 440, for each frame, the temporal variances of the blocks of the frame are converted. In one implementation, the temporal variances are converted based on a configured relationship between spatial and temporal variance and based on an assumption that a covariance value of zero exists for homogeneous blocks in the frame.

At block 450, for each frame, a first function is applied to provide an average of spatial variances. The average of spatial variances is computed over the blocks having spatial variances less than a variance value 'x' for the range of variance values from 0 to a maximum variance. The maximum variance is over the union of the set of spatial variances and temporal variances computed in blocks 420 and 430.

At block 460, for each frame, a second function is applied to provide an average of the converted temporal variances from block 440. The average of converted temporal variances is computed over the blocks having converted temporal variances less than a variance value 'x' for the range of variance values from 0 to a maximum variance. The maximum variance is over the union of the set of spatial variances and temporal variances computed in blocks 420 and 430.

Subsequently, at block 470, for each frame, an optimal frame noise variance is identified based on an intersection of the applied first function and the applied second function. In one implementation, the intersection point is less than the absolute maximum of V(x), where V(x) is the variance of the difference between the first function and the second function. Lastly, at block 480, an optimal video noise variance for the video is identified as the median value of the identified optimal frame noise variances of the frames of the video (as identified in block 470).

In one implementation, the optimal video noise variance may be used to select homogeneous blocks in a video and estimate a noise signal for the video, where the noise signal is used in processing of the video. In one implementation, the processing may include video compression, segmentation, format conversion, motion estimation, denoising, and/or filtering, to name a few examples.

FIG. 5 is a flow diagram illustrating a method 500 for generating noise models for video capture devices using mutual noise estimation for videos, according to an implementation of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by noise estimation component 140 as shown in FIG. 2.

Method 500 begins at block 510 where an optimal video noise variance is identified for each video of a set of videos corresponding to a determined type of video capture device. In one implementation, the optimal video noise variance is a median value of optimal frame noise variances of the frames of the video. The optimal frame noise variances are based on a determined relationship between spatial and temporal variances of blocks in each of the frames.

At block 520, a noise model is generated corresponding to the determined type of video capture device based on the identified optimal video noise variances of the videos. Subsequently, at block 530, the noise model for the determined type of video capture device is stored. Lastly, at block 540, the stored noise model is applied to denoise one or more uploaded videos indicated as captured by the determined type of video capture device.

Figure 6:
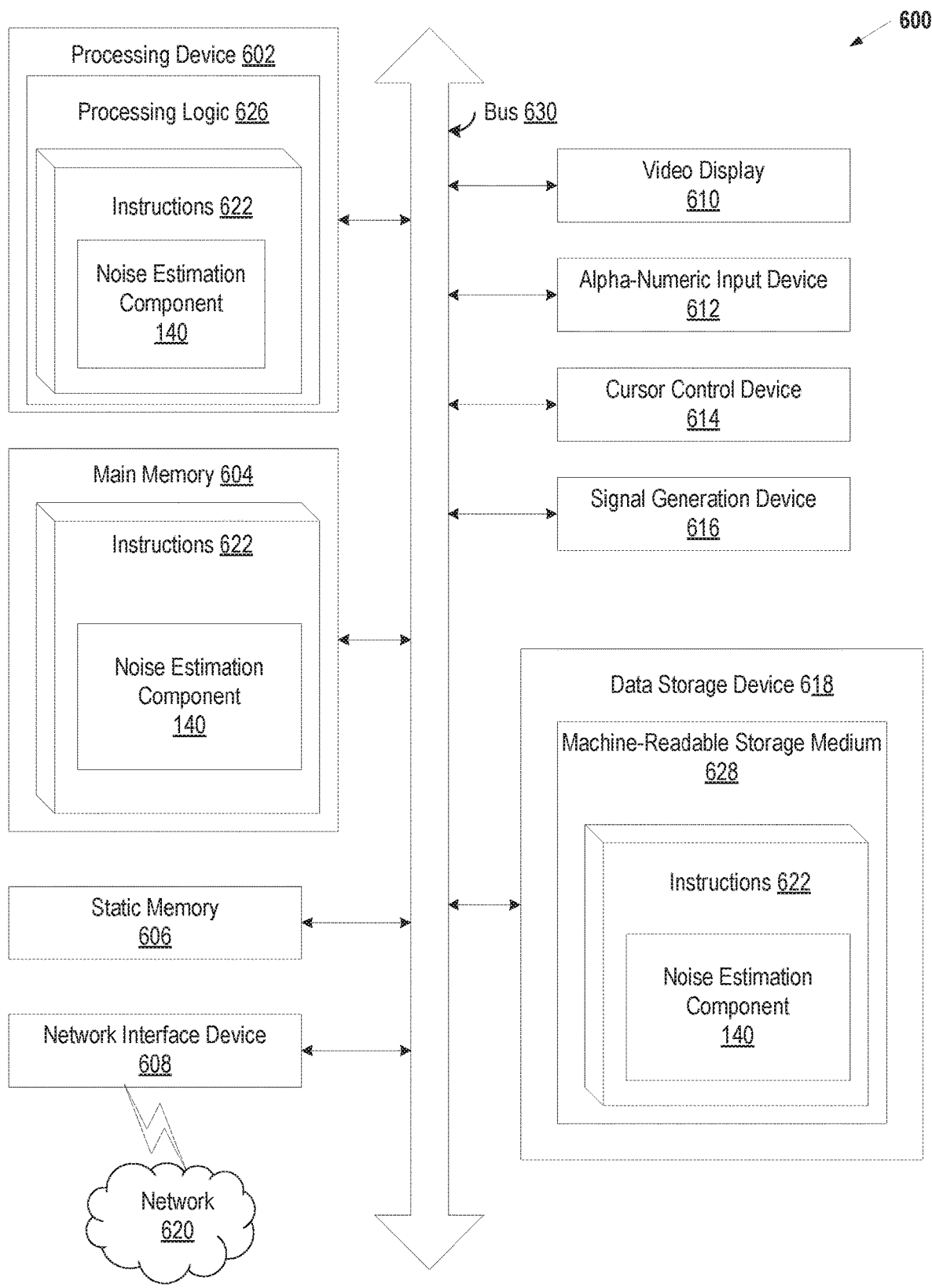
FIG. 6 is a block diagram illustrating one implementation of a computer system, according to an implementation.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a server device, such as server device 102, executing a noise estimation component 140, as described with respect to FIGS. 1 and 2. In another implementation, computer system 600 may be representative of a client device, such as client device 110A-110Z.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 (also referred to as a machine-readable storage medium), on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The computer-readable storage medium 628 may also be used to store instructions to perform a method for mutual noise estimation for videos, as described herein. While the computer-readable storage medium 628 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the disclosure. It should be apparent to one skilled in the art, however, that at least some implementations of the disclosure may be practiced without these specific details. In other instances, well-known components or methods are not described in detail or are presented in simple block diagram format in order to avoid unnecessarily obscuring the disclosure. Thus, the specific details set forth are merely exemplary. Particular implementations may vary from these exemplary details and still be contemplated to be within the scope of the disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   identifying an optimal video noise variance for each video of a set of videos corresponding to a determined type of video capture device, wherein the optimal video noise variance is based on a determined relationship between spatial variance and temporal variance of homogeneous blocks in each frame of frames of the set of videos;
   generating, by a processing device, a noise model corresponding to the determined type of video capture device based on the identified optimal video noise variances;
   storing the noise model for the determined type of video capture device: and
   applying, by the processing device, the stored noise model to denoise uploaded videos indicated as captured by the determined type of video capture device.

2. The method of claim 1, wherein each of the blocks comprises N×N pixels of the frame, wherein N is a positive number.

3. The method of claim 2, wherein each of the blocks is at least half-overlapped.

4. The method of claim 1, wherein applying the stored noise model to denoise uploaded videos comprises applying one or more of video compression, segmentation, format conversion, motion estimation, denoising, or filtering.

5. The method of claim 1, further comprising determining an optimal frame noise variance for each frame, wherein determining the optimal frame noise variance comprises:
   computing the spatial variance of each block in the frame;
   computing the temporal variance of each block in the frame;
   converting each of the temporal variance of blocks of the frame to converted temporal variance based on the determined relationship between the spatial and temporal variances and based on an assumption that a noise covariance between the homogeneous blocks is a constant value;
   applying a first function to the spatial variances in the frame, the first function to provide an average of the spatial variances over the blocks in the frame having spatial variances less than a variance value 'x' for a range of variance values;

applying a second function to the converted temporal variances in the frame, the first function to provide an average of the converted temporal variances over the blocks in the frame having converted temporal variances less than the variance value 'x' for the range of variance values; and selecting the optimal frame noise variance value for the frame based on an intersection of the applied first function and the applied second function.

6. The method of claim 5, wherein the temporal variance utilizes a determined number of frames prior to and subsequent to the frame.

7. The method of claim 5, wherein the range of variance values comprises variance values from zero to a maximum variance over a union of a set of the spatial variances and the temporal variances for the frame.

8. The method of claim 7, wherein the intersection point is less than an absolute maximum of V(x), wherein V(x) comprises a variance of a difference between the applied first function and the applied second function at a variance value of x.

9. The method of claim 1, wherein the spatial variance and the temporal variance apply to intensity values of each frame, and wherein the intensity values comprise a numerical value of a pixel in the frame, the numerical value corresponding to a grey level value of the pixel.

10. The method of claim 1, wherein the spatial variance and the temporal variance apply to intensity values of each frame, and wherein the intensity values comprise a numerical value of a pixel in the frame, the numerical value corresponding to a color channel value of the pixel.

11. The method of claim 1, wherein the optimal video noise variance is a median value of optimal frame noise variances of the frames of the set of videos.

12. A non-transitory machine-readable storage medium storing instructions which, when executed, cause a processing device to perform operations comprising:

computing a spatial variance of intensity values for each block in a frame of a video;

computing a temporal variance for the intensity values of each block in the frame;

converting each of the temporal variances of the blocks of the frame to converted temporal variances based on a determined relationship between the spatial and temporal variances and based on an assumption that a noise covariance between homogeneous block in the video is a constant value;

applying a first function to the spatial variances in the frame, the first function to provide an average of the spatial variances over the blocks in the frame having spatial variance values less than a variance value 'x' for a range of variance values;

applying a second function to the converted temporal variances in the frame, the second function to provide an average of the converted temporal variances over the blocks in the frame having converted temporal variance values less than a variance value 'x' for the range of variance values; and selecting an optimal frame noise variance value for the frame based on an intersection of the applied first function and the applied second function.

13. The non-transitory machine-readable storage medium of claim 12, wherein the operations further comprise:

identifying an optimal video noise variance for the video, the optimal video noise variance comprising a median value of the optimal frame noise variances of the frames of the video;

selecting, for each frame of the video, one or more of the blocks having a spatial variance that is less than the optimal video noise variance, the one or more frames selected as homogeneous blocks; and utilizing, by the processing device, the homogeneous blocks to estimate noise signal of the video.

14. The non-transitory machine-readable storage medium of claim 13, wherein the operations further comprise processing the video using the estimated noise signal of the video, wherein processing of the video comprises one or more of video compression, segmentation, format conversion, motion estimation, denoising, or filtering.

15. The non-transitory machine-readable storage medium of claim 12, wherein the temporal variance utilizes a determined number of frames prior to and subsequent to the frame, and wherein the temporal variance is determined using a motion compensation process.

16. The non-transitory machine-readable storage medium of claim 12, wherein the range of variance values comprises variance values from zero to a maximum variance over a union of a set of the spatial variances and the temporal variances for the frame.

17. A system comprising: a memory; and a processing device coupled to the memory, wherein the processing device is to:

identify an optimal video noise variance for each video of a set of videos corresponding to a determined type of video capture device, wherein the optimal video noise variance is based on a determined relationship between spatial variance and temporal variance of homogeneous blocks in each frame of frames of the set of videos;

generate a noise model corresponding to the determined type of video capture device based on the identified optimal video noise variances;

store the noise model for the determined type of video capture device; and apply the stored noise model to denoise uploaded videos indicated as captured by the determined type of video capture device.

18. The system of claim 17, wherein the variance is calculated for intensity values of pixels of each the frames of the set of videos, wherein the intensity values comprise a numerical value of each of the pixels in the frame, the numerical value corresponding to at least one of a grey level value of the pixel or a color channel value of the pixel.

19. The system of claim 17, wherein the optimal video noise variance is a median value of optimal frame noise variances of the frames of the set of videos.

20. The system of claim 19, wherein the processing device is to identify the optimal frame noise variance for each frame by:

computing the spatial variance of each block in the frame;

computing the temporal variance of each block in the frame;

converting each of the temporal variance of the blocks of the frame to converted temporal variance based on the determined relationship between the spatial and temporal variances of the homogeneous blocks and based on an assumption that a noise covariance between the homogeneous block is a constant value;

applying a first function to the spatial variances in the frame, the first function to provide an average of the spatial variances over the blocks in the frame having spatial variances less than a variance value 'x' for a range of variance values;

applying a second function to the converted temporal variances in the frame, the first function to provide an average of the converted temporal variances over the blocks in the frame having converted temporal variances less than a variance value 'x' for the range of variance values; and selecting the optimal frame noise variance value for the frame based on an intersection of the applied first function and the applied second function.

* * * * *